(12) United States Patent
Paczkowski et al.

(10) Patent No.: US 11,860,688 B1
(45) Date of Patent: Jan. 2, 2024

(54) NETWORK GENERATED PRECISION TIME

(71) Applicant: T-MOBILE INNOVATIONS LLC, Overland Park, KS (US)

(72) Inventors: Lyle W. Paczkowski, Mission Hills, KS (US); Peter Paul Dawson, Portsmouth, NH (US); Walter F. Rausch, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 7 days.

(21) Appl. No.: 16/860,680

(22) Filed: Apr. 28, 2020

(51) Int. Cl.
| | |
|---|---|
| G06F 1/14 | (2006.01) |
| G06F 1/12 | (2006.01) |
| G06F 16/27 | (2019.01) |
| H04J 3/06 | (2006.01) |
| H04L 67/10 | (2022.01) |
| G04R 20/00 | (2013.01) |

(52) U.S. Cl.
CPC ............... *G06F 1/14* (2013.01); *G06F 1/12* (2013.01); *G06F 16/27* (2019.01); *H04J 3/0667* (2013.01); *H04J 3/0697* (2013.01); *H04L 67/10* (2013.01); *G04R 20/00* (2013.01)

(58) Field of Classification Search
CPC .... G06F 1/14; G06F 16/27; G06F 1/12; H04J 3/0667; H04J 3/0697; H04L 67/10; G04R 20/00
See application file for complete search history.

(56) References Cited

U.S. PATENT DOCUMENTS

| | | | |
|---|---|---|---|
| 10,511,590 B1* | 12/2019 | Bosch | H04L 63/20 |
| 2014/0004886 A1* | 1/2014 | Gillett | H04W 4/021 |
| | | | 455/456.6 |
| 2014/0176660 A1* | 6/2014 | Khay-Ibbat | H04N 7/147 |
| | | | 348/14.02 |
| 2015/0349987 A1* | 12/2015 | Soriaga | H04J 11/0036 |
| | | | 370/329 |
| 2017/0220062 A1* | 8/2017 | Shen | G06F 1/14 |
| 2018/0109655 A1* | 4/2018 | Ichimura | G06F 1/12 |
| 2018/0144105 A1* | 5/2018 | Yao | G06F 21/10 |
| 2019/0036917 A1* | 1/2019 | Sun | H04L 9/3213 |
| 2019/0158594 A1* | 5/2019 | Shadmon | H04L 9/0819 |

(Continued)

*Primary Examiner* — Walter J Divito
*Assistant Examiner* — Anthony Luo
(74) *Attorney, Agent, or Firm* — SHOOK, HARDY & BACON L.L.P.

(57) ABSTRACT

Synchronization of precision timing signals maintained by multiple communication networks is described. A precision timing signal may be generated based on the change in state of a plurality of processors. Synchronization of the precision timing signals may be facilitated by a computing device monitoring at least two communication networks. The computing device may generate time offsets that are derived from the precision timing signals associated with each communication network. The time offsets may be communicated by the computing devices to remote devices communicatively coupled to the computing device via a first communication network. The remote devices may adjust locally maintained application clocks based on the time offset. The adjustment may synchronize the local application clock with the precision timing signal of a second communication network. In response, a remote device may communicatively couple with the second communication network.

20 Claims, 8 Drawing Sheets

(56) References Cited

U.S. PATENT DOCUMENTS

2019/0307957 A1* 10/2019 Worden .............. A61M 5/1723
2020/0064859 A1*  2/2020 Zhang ................. G05D 1/0276
2021/0119775 A1*  4/2021 Klinkner ............... H04L 9/0643

* cited by examiner

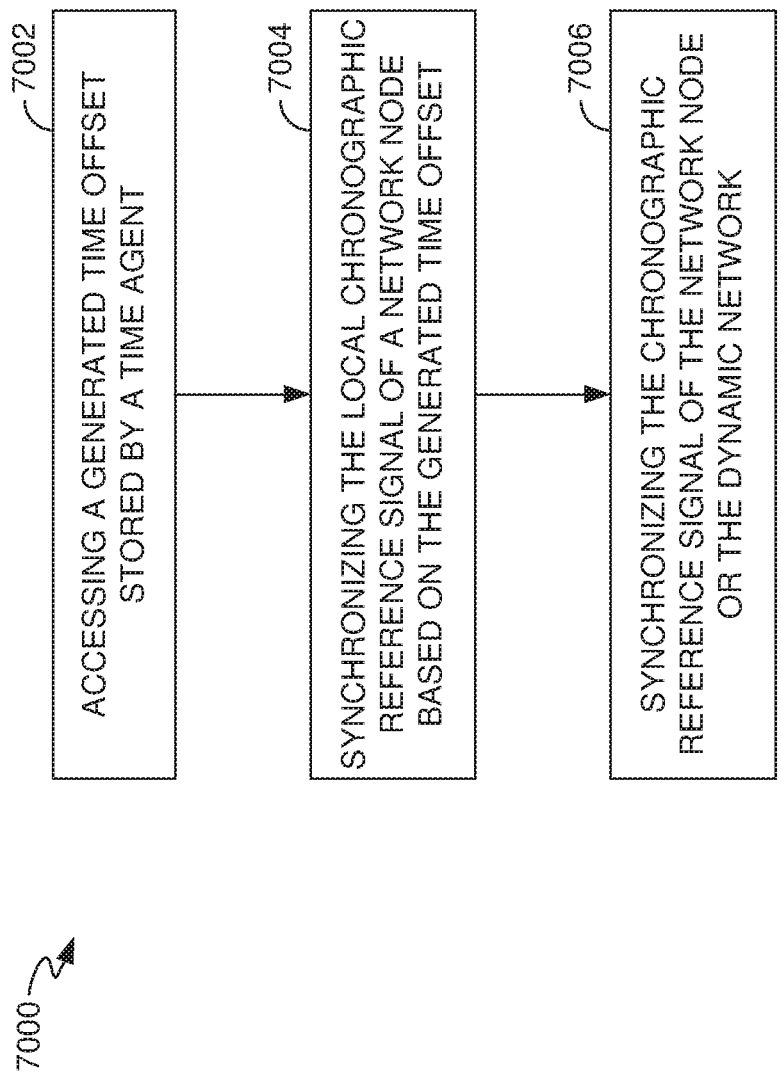

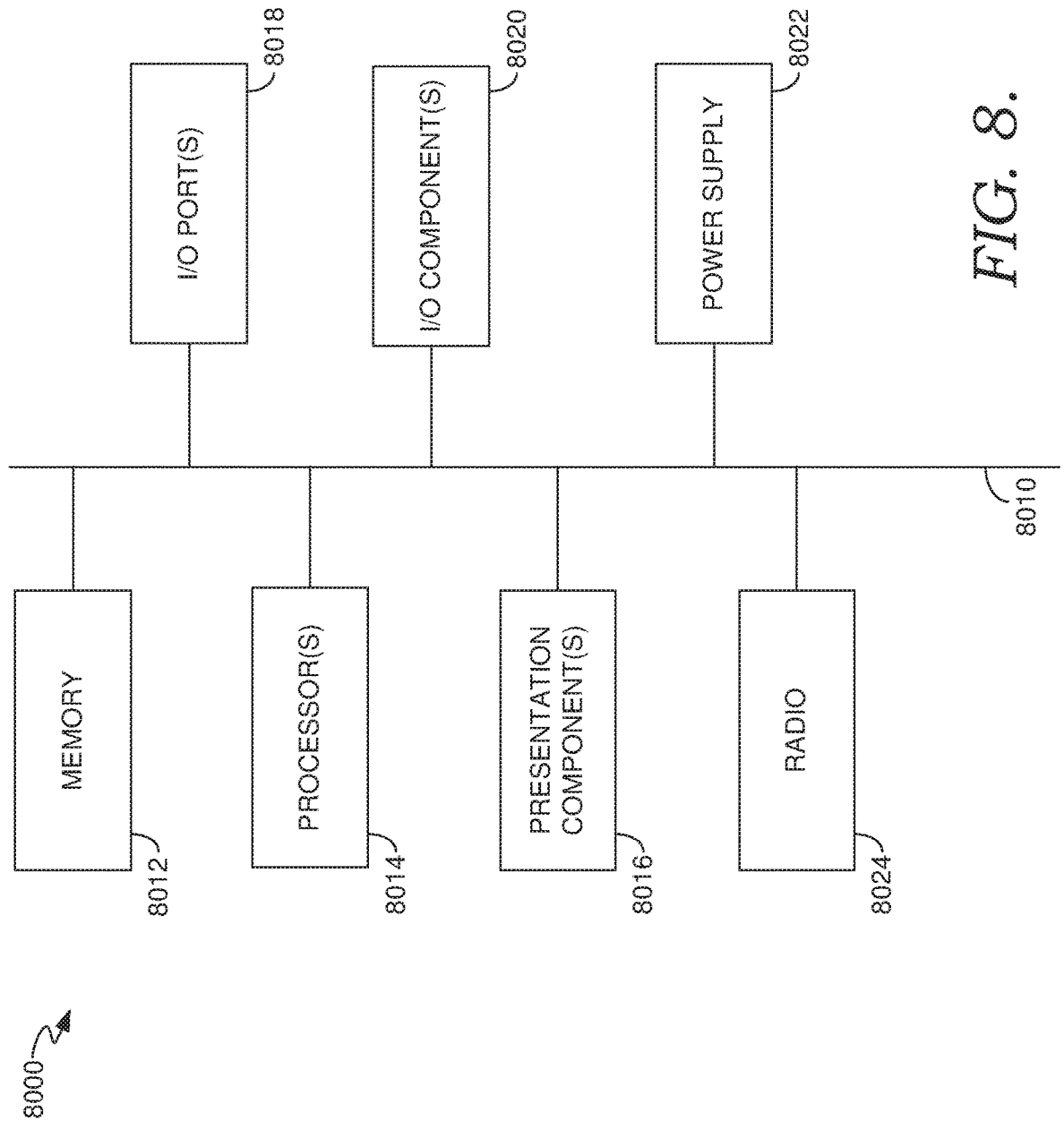

NETWORK GENERATED PRECISION TIME

TECHNICAL FIELD

Aspects hereof relate to precision timing of communication networks and methods for devices to utilize aspects thereof.

BRIEF SUMMARY

A high-level overview of various aspects of the technology described herein is provided as an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

Precision time is an often unseen but critical element of communication network infrastructure. For example, in time division duplex wireless communication networks the precision timing signal is used to, among other things, orchestrate when the user equipment transmits and the base station listens, and when the base station transmits and the user equipment listens. However, the precision timing signal of a particular network and the precision timing signal of another network are rarely, if ever, identical. This means that when a device communicating via a first communication network attempts to use the precision time of the first communication network to communicate via a second communication network the device will lose connectivity with the second communication network.

Said another way, the difference in precision timing signals between two communication networks may cause a device attempting to switch from the first communication network to the second communication network to transmit data to the second communication network when the second communication network is attempting to transmit data to the device. Similarly, the device may listen for data while the second communication network is also listening for data. That said, even if the differences in precision timing signals is not reversed as illustratively described above, relatively small differences in precision timing signals can cause communication errors.

Traditionally, the differences in precision timing signals, or chronographic reference signals, in single communication network devices did not lead to catastrophic problems. For example, in traditional voice telecommunications a relatively slight difference between a cell phone and a base station would result in audio artifacts or audio bleeding between other calls. While these effects are undesirable, traditional systems could resynchronize within a few seconds through traditional timeout recovery techniques. Alternatively, the cell phone (or other user equipment) may briefly disconnect and reconnect with the base station in an attempt to resynchronize.

However, the proliferation of multi-network capable or reliant devices has magnified the impact of differences in chronographic reference signals. For example, when a smart phone transitions between a first communication network and a second communication network without synchronizing the chronographic reference signal, data transmissions being facilitated by the communication network can experience failures, dropped packets, or corruption. Moreover, some devices may need constant data streams from a communication network or other devices to function correctly. For example, drones, autonomous vehicles, or semi-autonomous vehicles are typically exchanging a constant stream of data with other devices. Such data can include speed, direction, destination, fuel status, weight, position, and the like. This stream of data may be constantly relied upon by these devices to aid in acceleration, lane changes, breaking, and numerous other automated decisions. The traditional precision timing recovery techniques (e.g., timeout recovery, disconnect and reconnect, or the other similar techniques) may be incapable of addressing precision time synchronization (e.g., chronographic reference signal synchronization) necessary to safely facilitate these multi-network capable or reliant devices. For example, a delay of 1 second can delay application of an autonomous vehicle's breaks by 88 feet (traveling at 60 miles per hour). Thus, an autonomous vehicle may fail to apply the brakes for approximately 88 feet while a traditional precision timing system attempts to resynchronize.

Accordingly, some aspects described herein generally relate to precision time reconciliation across disparate networks. For example, some aspects are directed to a method for generating chronographic reference signal offsets that can facilitate adjustment of an application clock of a remote computing device. In an aspect, the method comprises receiving a first time interval corresponding to a chronographic reference signal of a first network by a time agent. The first time interval can be generated based on a change in state of a first set of processors. The time agent can receive a second time interval corresponding to a chronographic reference signal of a second network. In response, the method can further comprise, generating a first time offset interval based on a comparison of the first time interval and the second time interval. A signal can be transmitted in accordance with the generated first time offset interval to a remote computing device.

In some aspects, the remote computing device can adjust an application clock based on the first time offset interval. The remote computing device can adjust the application clock based on a determination to transition from communicating with the first network to communicating with the second network. The determination to transition between the first network and the second network can be based on the remote computing device detecting that the quality of the communication with the first network is below a predetermined threshold. Additionally, or alternatively, the determination to transition can be based on the remote computing device detecting that the quality of communication with the second network is above a predetermined threshold.

Some aspects herein are directed to non-transitory storage media storing computer instructions that when executed by at least one processor cause the at least one processor to perform operations. In an aspect, the operations comprise receiving a first signal transmitted over a first network, wherein the first signal comprises a first time offset interval that was generated based on a comparison of a first network's time interval and a second network's time interval. The operations can further comprise receiving a set of signals indicative of a quality of communication between the set of processors and the network the respective signal is transmitted over, the set of signals comprising a signal transmitted over the first network and a signal of the second network. In response to a determination that the quality of communication between the set of processors and the first network is below a communication threshold or the quality of communication between the set of processors and the second network is above the communication threshold, initiating communication with the second network based on the first time offset interval.

Some aspects herein are directed to a system for precision time reconciliation across desperate networks. In an aspect, the system comprises a processor and a set of computer codes that when executed by the processor cause the processor to perform operations. The operations may comprise receiving a first time interval corresponding to a chronographic reference signal of a first network, the first time interval generated based on a change in state of a first set of processors. The operations may further comprise, generating, by a second processor, a first time offset interval based on a comparison of the first time interval and the second time interval. Additionally, the operations can include transmitting, over a network, at least a first signal to one or more remote computing devices, the first signal being transmitted in accordance with the generated first time offset interval.

Additionally, some aspects described herein generally relate to utilization of precision time reconciliation to synchronize precision time in dynamic networks. For example, in an aspect a network node accesses time offsets maintained by a time agent. The network node searches for any other network nodes within a predetermined range. Where the network node does not detect at least one other network node, the network node synchronizes the local chronographic reference signal with the communication network associated with the time agent. The local chronographic reference signal can be propagated through a dynamic network assembled by the network node. For example, when the network node detects at least one other network node, a determination is made based on how many other nodes are connected to the other network node. Where the other network node is connected to at least one fewer network nodes than the network node, the network nodes local chronographic reference is communicated to the other network node.

BACKGROUND

Precision wireless network timing is crucial for network operation. For example, in time division duplex wireless communication networks, the precision timing signal is used to, among other things, orchestrate when the user equipment transmits and the base station listens, and when the base station transmits and the user equipment listens. Generally speaking, current precision timing is handled by the global positioning system (GPS) or other global navigation satellite systems (GNSS) (e.g., GLONASS, Galileo, Beidou). However, differences in network infrastructure, equipment, location, and settings can create differences in precision timing signals (i.e., chronographic reference signals) between networks. These precision timing differences may cause transitions between a first network and a second network to fail, require extended recovery protocols, or terminate established data transmissions.

BRIEF DESCRIPTION OF THE DRAWINGS

Illustrative embodiments of the present invention are described in detail below with reference to the attached drawing figures, and wherein:

FIG. 7 depicts an exemplary method for synchronizing chronographic reference signals, according to an aspect described herein; and FIG. 8 depicts an exemplary computing device suitable for use in implementing aspects herein.

DETAILED DESCRIPTION

As used herein unit prefixes, such as μ (micro), p (pico), f (femto) are used in their standard meaning according to the International System of Units (SI). For example, 1 μs=0.000001 seconds=1×10$^{-6}$ seconds. However, it will be understood by those skilled in the art that references made herein to a "micro cell" or a "femto cell" are used in the commonly understood context of the industry and not necessarily as a literal SI prefix. Additionally, the customary SI unit abbreviations are used herein with the standard meaning. For example, and as illustrated above, s=second(s). In another example, Hz=Hertz=cycle/second. Accordingly, a cycle occurring every ns=1 GHz.

A chronographic reference signal (also referred to herein as a precision time signal, or time interval) refers to any signal or data that is used by a device to determine the time, increase a device's local clock by a predetermined interval, or indicate a repeating zero point from which the device can begin tracking time. In this way, a chronographic reference signal can facilitate time keeping to a degree of precision dictated by the signal itself or the precision of the device's local clock.

The subject matter described herein is generally described in the context of a wireless communications network. This is done merely for the sake of clarity and those skilled in the art may, upon reading this description, understand other contexts in which the subject matter may be utilized. For example, the inventors have contemplated the subject matter described herein in the context of infrastructure networks (e.g., an AC power grid), economic networks (e.g., high-frequency trading, flash trading, and generalized electronic trading), air traffic control networks, first responder networks (e.g., EMS, police, fire rescue), among others. Again, however, even these examples are not provided to limit the scope of this description.

Figure 1:
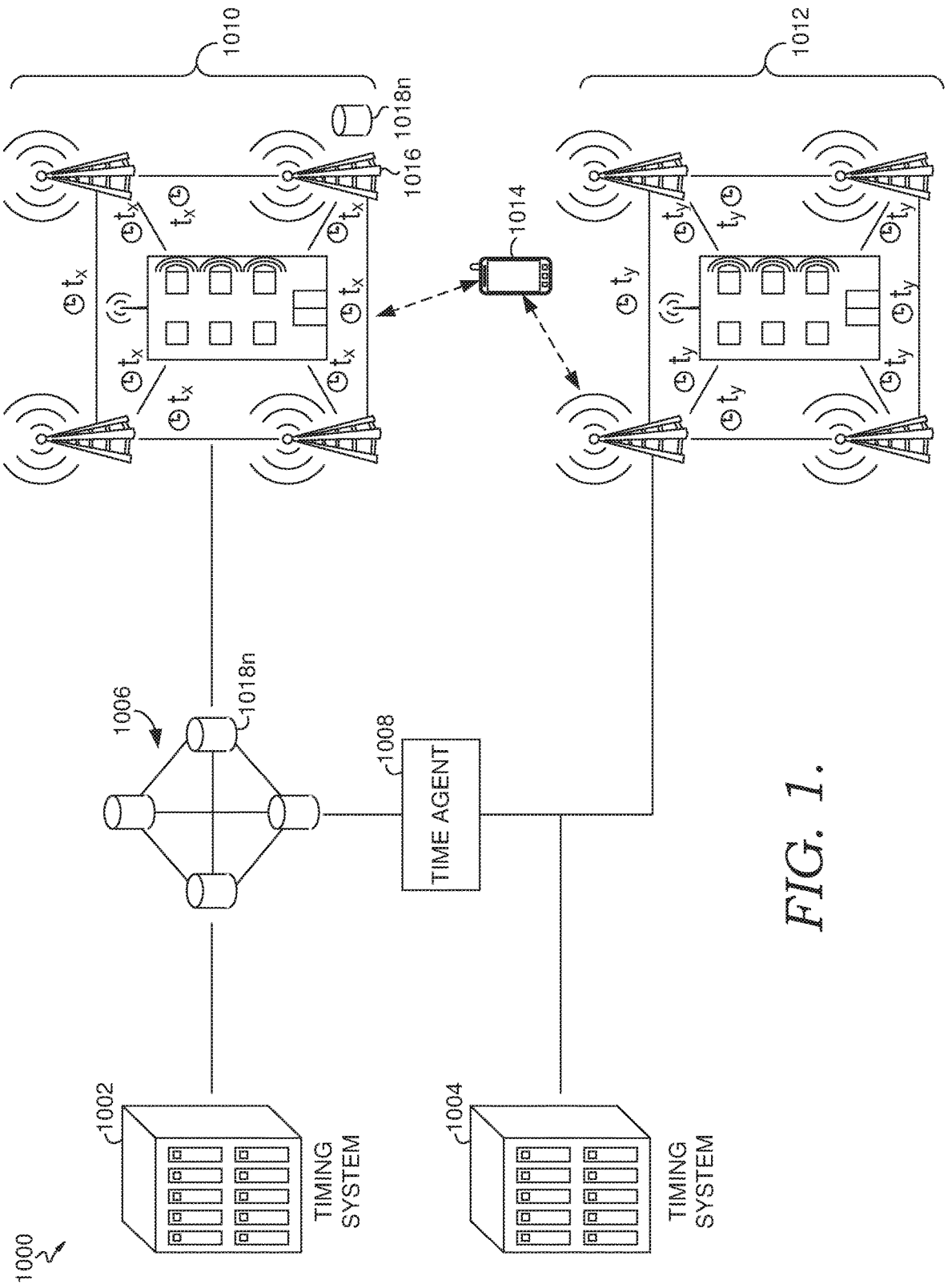
FIG. 1 depicts an exemplary environment suitable for use in implementing aspects herein.

Turning to FIG. 1, an example network environment 1000 is provided, in accordance with aspects described herein. Network environment 1000 includes a first network timing system 1002, a second network timing system 1004, one or more databases 1006, a time agent 1008, a first communication network 1010, one or more user equipment 1014, and a second communication network 1012. Network environment 1000 is but one example of a suitable network environment and is not intended to suggest any limitation as to the scope of use or functionality of the disclosure. Neither should network environment 1000 be interpreted as having any dependency or requirement relating to any one or combination of components illustrated. Each of the components shown in FIG. 1 may be implemented via any type of computing device, such as computing device 8000 described in connection to FIG. 8, for example.

Generally, the first network timing system 1002 and the second network timing system 1004 each generates and transmits a precision timing signal to corresponding communications networks, such as first communication network 1010 and second communication network 1012 respectively. For example, first network timing system 1002 generates a precision timing signal that is transmitted to first communication network 1010. In some aspects, the first network timing system 1002 comprises an atomic clock (such as a cesium clock), a global navigation satellite systems (GNSS) clock (e.g., a GPS clock, GLONASS clock, Galileo clock, Beidou clock), or any combination thereof. Additionally, or alternatively, the first network timing system 1002 comprises a plurality of communicatively coupled processors that generate a time interval, such as described in relation to the processors that generate output based on a change of state in U.S. patent application Ser. No. 16/044,235 filed Jul. 24, 2018 which is incorporated herein by reference.

Similarly, the second network timing system 1004 generates a precision timing signal that is transmitted to the second communication network 1012. In some aspects, the second network timing system 1004 comprises an atomic clock (such as a cesium clock), a global navigation satellite systems (GNSS) clock (e.g., a GPS clock, GLONASS clock, Galileo clock, Beidou clock), or any combination thereof. Additionally, or alternatively, the second network timing system 1004 comprises a plurality of communicatively coupled processors that generate a time interval, such as described in relation to the processors that generate output based on a change of state in U.S. patent application Ser. No. 16/044,235, filed Jul. 24, 2018, which is incorporated herein by reference in its entirety.

Some aspects of network environment 1000 includes one or more database networks 1006 of databases, such as database 1018n. The one or more database networks 1006 can take the form of a distributed database, distributed ledger (such as a hyper ledger, block chain, and so on) or any other public or private distributed database. Each database 1018n of database network 1006 is connected and can be adapted to communicate over a public computer network, the internet, an intranet, an extranet, or any private communication network. Generally, database 1018n is accessible by any device that has an Internet connection over a network. A distributed ledger, such as block chain, as is known in the art, is a system that enables users' access to securely store data in a public place or private place. The data stored in the block chain is deemed secure, as each time data is written to the system, the written data is dependent on previously written data, which can include performing cryptographic operations to hash the data. One benefit of using a distributed database, such as a distributed ledger like block chain, is that once data is written to the block chain and a block chain transaction is created, that transaction remains intact, and can be verified in the future. The reason for this, is that data is continually written to the distributed ledger, e.g., after a particular transaction is made, and that later data is dependent on an earlier particular transaction.

Accordingly, by writing the time offset interval data to a distributed storage network, such as database network 1006, subsequent verification of that data is practically ensured to be accurate. In some aspects, the distributed database is a public block chain, which receives data for storage, such as chronographic reference signals, from one, one or more, and/or a plurality of entities. The entities need not be related, and the type of data need not be the same. In general, entities storing instances of the block chain are unrelated, and the type of data can vary to almost any type of digital data, e.g., not limited to identity data, commercial data, cryptocurrency data, average time interval, etc. However, in some aspects, the entities storing instances of the distributed database, such as a block chain, are associated with one, one or more, or a plurality of subscribers to and/or operators of a digital chronographic service. Thus, the data received for storage is configured to be processed to generate a dataset that is dependent on previous data stored to the block chain. Accordingly and as a product of the dataset's dependency on the previous data stored to the distributed database the distributed database ensures that datasets stored to the block chain are not modifiable (i.e., immutable), as each later dataset stored to the distributed database continues to be dependent on previous dataset stored to the distributed database. In some aspects, the distributed database (such as database network 1006) is a private block chain, which receives data for storage from one or more computing devices at least partially dedicated to producing average time intervals (such as user equipment 1014) and/or one or more servers at least partially dedicated to producing chronographic reference signals (such as the first network timing system 1002).

Time agent 1008 generally monitors the precision timing signals of two or more communication networks (e.g., communication network 1010, communication network 1012) and generates a time signal offset between the monitored networks. Monitoring the precision timing signals can be direct or indirect. For example, time agent 1008 can directly receive a first time signal generated by timing system 1002 that corresponds to a digital chronographic reference signal of the first communication network 1010. Illustratively, and not for limitation, time agent 1008 may detect a time reference signal for a first network ($t_x$) of 123 femtoseconds (i.e., $1.23 \times 10^{-17}$ seconds). The time agent 1008 also receives a second time signal generated by timing system 1004 that corresponds to a digital chronographic reference signal of communication network 1012. For example, time agent 1008 may detect a time reference signal for a second network ($t_y$) of 124 femtoseconds (i.e. $1.24 \times 10^{-17}$ seconds). Additionally, or alternatively, time agent 1008 can receive a time signal generated by timing system 1002 via database network 1006.

Time agent 1008 determines the difference in any two time signals associated with the communication networks the time agent 1008 is monitoring. For example, time agent 1008 may compare $t_x$ and $t_y$ to determine a difference (i.e., $|t_x - t_y| = \Delta t_{xy}$). In this illustrative case $\Delta t_{xy} = 1$ femtosecond. However, it will be understood by those skilled in the art that the value may vary widely depending on implementation, the networks involved, any network mandated time precision requirements, the processor and communication speeds, or any number of other factors. For example, in some networks time reference signals need only be precise to the millisecond, microsecond, 100s of femtoseconds, or any other unit of time.

Additionally, based on the determined difference between the digital chronographic reference signals, time agent 1008 generates a time signal offset for use by user equipment, such as UE 1014, during a user equipment's transition from communication network 1010 to communication network 1012. By way of non-limiting example, a determined difference of 1 femtosecond between $t_x$ and $t_y$ can be stored, in some embodiments, by time agent 1008 in a locally maintained reference table.

Time agent 1008 can, directly or indirectly, distribute the time signal offset to user equipment, such as user equipment (UE) 1014, to facilitate seamless communication network handoffs. For example, time agent 1008 can broadcast a copy of the locally maintained reference table through the first communication network 1010. The first communication network can facilitate distribution of the locally maintained reference table as one or more data transmissions to UE 1014. Additionally, or alternatively, time agent 1008 can communicate a copy of the locally maintained reference table to the distributed database network 1006.

The first communication network 1010 and second communication network 1012 provides voice and/or data services to user equipment or corresponding users that are registered or subscribed to utilize the services provided by a communications provider. For example, first communication network 1010 comprises a WIFI, wireless mesh, Bluetooth, or similar wireless communication network. Additionally, or alternatively, first communication network 1010 comprises any communication network providing voice and/or data service(s), such as, for example, a 1× voice circuit, a 3G network (e.g., CDMA, CDMA2000, WCDMA, GSM, UMTS), a 4G network (WiMAX, LTE, HSDPA), a 5G network, a 6G network, or the like. For example, the first communication network 1010, the second communication network 1012, or both can include a plurality of fixed or mobile base stations (such as base station 1016) that facilitate wireless communications between UE 1014 and other devices, UEs, or the Internet. The base stations are wireless communications stations that are installed at fixed locations (such as a communication tower), a mobile base station, small cell, mini cell, micro cell, pico cell, and/or a femto cell.

In aspects, base station 1016 is a wireless communications station that is installed at a fixed location, such as a communication tower, as illustrated in FIG. 1. The communication tower may be a structure designed to support one or more antennas for communications and/or broadcasting. In other embodiments, base station 1016 is a mobile base station, small cell, mini cell, micro cell, pico cell, and/or a femto cell. The base station 1016 may be a gNode B in an 5G telecommunications network and may be used to communicate as part of the wireless communications network. In this way, base station 1016 can facilitate wireless communications between user equipment 1014 and other devices, or the Internet.

The base station 1016 may include at least one baseband unit (BBU) responsible for, among other things, digital baseband signal processing. For instance, CDMA/EVDO and LTE Internet protocol (IP) packets are received from a wireless communications network and are digitally combined by the BBU at the base station 1016. The blended digital baseband signal is transmitted to a radio at the base station 1016. Digital baseband signals received from the radio are demodulated by the BBU and the resulting IP packets are transmitted by the BBU to the network. The base station 1016 may include a radio (not shown) or a remote radio head (RRH) that generally communicates with one or more antennas associated with the base station 1016. The base station may support multiple-input-multiple-output (MIMO) and/or time division duplex or any other suitable communication protocols. In some aspects, base station includes a database 1018*n*. In some aspects, base station 1016 includes a base station clock (device clock) that facilitates time division duplex, MIMO, and or other communication protocols supported by base station 1016 between the base station and one or more user devices (such as user equipment 1014). Base station 1016 can also include a database, such as database 1018*n*, that is part of database network 1006.

User equipment (UE) 1014 can communicate with other devices, such as mobile devices, servers, etc. The user equipment 1014 can take on a variety of forms, such as a personal computer, a laptop computer, a tablet, a netbook, a mobile phone, a smart phone, smart sensor, a personal digital assistant, mobile hotspots or any other device capable of communicating with other devices by way of a network. Makers of illustrated user equipment include, for example, Research in Motion, Creative Technologies Corp., Samsung, Apple computers, Nokia, Motorola, and the like. A user equipment 1014 may comprise, for example, a display(s), a power source(s) (e.g., a battery), a data store(s), a speaker(s), memory, a buffer(s), and the like. In some aspects, user equipment 1014 can be a sub component of another device. For example, it is contemplated that user equipment 1014 can be included in a vehicle, a video board (e.g., a video billboard), or other similar devices.

In embodiments, UE 1014 comprises a wireless or mobile device with which a wireless telecommunications network(s) can be utilized for communication (e.g., voice and/or data communication). In this regard, the UE 1014 can be any mobile computing device that communicates by way of, for example, a 3G, 4G, 5G, or 6G network. UE 1014 may connect, at least temporarily, to a base station of the first communication network 1010 or the second communication network 1012. Accordingly, UE 1014 can communicate with other devices, networks, and systems through the first communication network 1010 or the second communication network 1012.

Additionally, UE 1014 can request, retrieve, or receive, directly or indirectly, data from database 1018*n*, time agent 1008, timing system 1002, timing system 1004, any other device, or any combination thereof through the first communication network 1010 or the second communication network 1012. For example, UE 1014 can request time offset data generated by a time agent (e.g., time agent 1008). In some aspects, the request is communicated by base station 1016 through the first communication network 1010 to time agent 1008. In some aspects, base station 1016 can access a locally maintained copy of a distributed ledger that includes the generated offsets, such as can be maintained by database 1018*n*. The data can be transmitted to UE 1014. Additionally, or alternatively, UE 1014 can retrieve time offset data from a time agent or a database.

Figure 2:
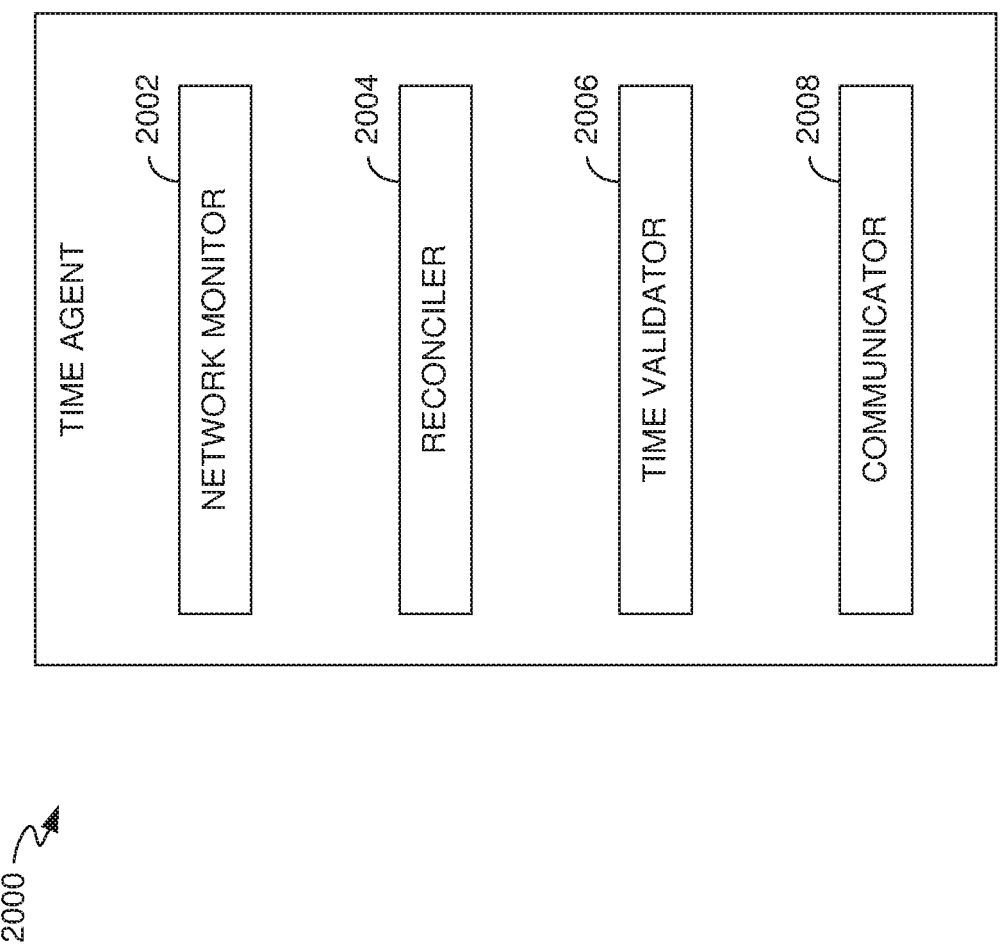
FIG. 2 depicts an exemplary time agent for generating time offsets, according to an aspect described herein.

With reference to FIG. 2, an example time agent 2000 is provided in accordance with aspects described herein. Time agent 2000 comprises memory, one or more processors, input/output (I/O) ports, input/output components, a network monitor 2002, a reconciler 2004, and a communicator 2008. For example, time agent 2000 includes some or all of the components of computing device 8000 (as described in reference to FIG. 8) and network monitor 2002, a reconciler 2004, and a communicator 2008.

Network monitor 2002 generally facilitates connecting to and monitoring multiple communication networks to receive or access precision timing signals. In some embodiments, network monitor 2002 can connect to one or more databases 1018*n* of the database network 1006 that maintains a local copy of a distributed time signal database via network 108. For example, network monitor 2002 may receive a first time signal generated by timing system 1002 that corresponds to a digital chronographic reference signal of communication network 1010. For another example, network monitor 2002 may access digitally signed data set, hash, or a combination of both stored in a database 1018*n* of a distributed database network 1006. In some aspects, when the network monitor 2002 detects the digital chronographic reference signal a processor associated with network monitor 2002 can begin to cyclically change state.

The processor of network monitor 2002 may be customized such that at least one core of the processor changes state every fs, ps, ns, µs, ms, cs, ds, and/or about every fs, ps, ns, µs, ms, cs, ds. The change in state can be determined by output in a variety of forms; such as a change in voltage, a binary data stream (i.e. a string of 1's and 0's), a predetermined value (set of values) in a predetermined register (set of registers), or the like. For example, the processor may be monitored by a zero crossing detector, a threshold detector, and/or a threshold limiter integrated with computing device. In such an embodiment, as the voltage of the processor crosses or substantially approaches zero V, and/or crosses or substantially approaches a predetermined threshold V, and output is generated by the zero crossing detector, threshold detector, and/or threshold limiter. In another example, processor may be physically and/or programmatically configured to write or modify, in a predetermined way (e.g., by changing a 1 to a 0 or 0 to a 1, or adding a 1 or 0), a value in a register accessible by processor. Generally speaking however, the output indicates a change of state of the processor.

In another example, the processor a may be specially configured such that one operational cycle including at least one change of state and a corresponding output is completed by the processor every fs, ps, ns, µs, ms, cs, ds, and/or about every fs, ps, ns, µs, ms, cs, ds. Said another way, in some aspects the processor may generate an output at or near a clock speed of a peta Hz (PHz), tera Hz (THz), giga Hz (GHz), mega Hz (MHz), and so on. Additionally, and/or alternatively, the processor may be specially configured such that in combination with embedded instructions and/or non-embedded instructions causes at least one change of state and a corresponding output is completed by the processor every fs, ps, ns, µs, ms, cs, ds, and/or about every fs, ps, ns, µs, ms, cs, ds. In other words, in some aspects the processor is a specially designed processor that is physically and/or programmatically configured to change state every femto second (fs) or about every femto second. In some aspects, the processor is a specially designed processor that is physically and/or programmatically configured to change state every pico second (ps) or about every pico second. In some aspects, the processor is a specially designed processor that is physically and/or programmatically configured to change state every nano second (ns) or about every nano second. In some aspects, the specially designed processor is physically and/or programmatically configured to change state every micro second (µs) or about every micro second. In some aspects, the processor is a specially designed processor that is physically and/or programmatically configured to change state at a predetermined time interval that is ≤1 second. In some aspects, the processor is a specially designed processor that is physically and/or programmatically configured to change state at a predetermined time interval that is ≥1 femtosecond. In view of the description, the design and fabrication of such a specially configured RISC, ARM, ASIC, CSP, and/or CISC processor will be understood by those skilled in the art. In some aspects, the processor is one or a plurality of processors.

Continuing with network monitor 2002, the processor continues to change state until a digital chronographic reference signal of communication network 1012 is received. The number of changes in state of the processor are monitored by network monitor 2002. Once a digital chronographic reference signal from a second communication network is received, the network monitor 2002 transmits the total number of changes in state to reconciler 2004.

Reconciler 2004 generally facilitates the determination of a difference in any two time signals associated with the communication networks the time agent 1008 is monitoring.

In an aspect, reconciler 2004 determines the difference in the time signals based on the total number of changes in state of the processor associated with network monitor 2002. For example, reconciler 2004 can be programed with a conversion factor specific to the processor of network monitor 2002 such that the total number of changes in state can be converted to a time. Accordingly, the reconciler can generate a time signal offset for transitioning between the first network and the second network by multiplying the total number of changes in state reported by the network monitor 2002 with the conversion factor.

In another aspect, reconciler 2004 can detect and compare data encoded in the time reference signal $t_x$ and $t_y$ to determine a difference in the reference signals. As described above, time reference signals can include data that identifies a specific time that corresponds with generation of the time reference signal. Reconciler 2004 can extract the data from the time reference signals. For example, the data included in a particular time reference signal for a first network ($t_x$) may indicate that the particular time reference signal was generated at 123 femtoseconds (i.e., $1.23 \times 10^{-17}$ seconds). Similarly, the data included in a corresponding time reference signal for a second network ($t_y$) may indicate that the particular time reference signal was generated at 124 femtoseconds (i.e. $1.24 \times 10^{-17}$ seconds).

Once extracted, the data can be compared by reconciler 2004 to determine a difference between communications networks. For example, reconciler 2004 may compare $t_x$ and $t_y$ to determine a difference (e.g., $t_x - t_y = \Delta t_{xy}$). Reconciler 2004 can generate a time signal offset for transitioning between the first network and the second network based on the determined difference. In this illustrative case $\Delta t_{xy} = 1$ femtosecond.

Communicator 2008 generally facilitates communications with other devices communicatively coupled to time agent 1008. For example, communicator 2008 can communicate with one or more databases in a distributed database network, such as database 1018n of distributed database network 1006. Communicator 2008 may also communicate indirectly with devices communicatively coupled with the first communication network 1010, such as UE 1014.

In some embodiments, time agent 2000 further comprises a time validator 2006. Time validator 2006 includes one or more cryptographic algorithms that can verify the authenticity of data received by time agent 2000. For example, time validator 2006 can cryptographically analyze a certificate of authority, a hash, or any other cryptographic key included with or encoded in a chronographic reference signal. Additionally, time validator 2006 can cryptographically sign or hash data (such as a time signal offset) maintained in the memory of time agent 2000.

Figure 3:
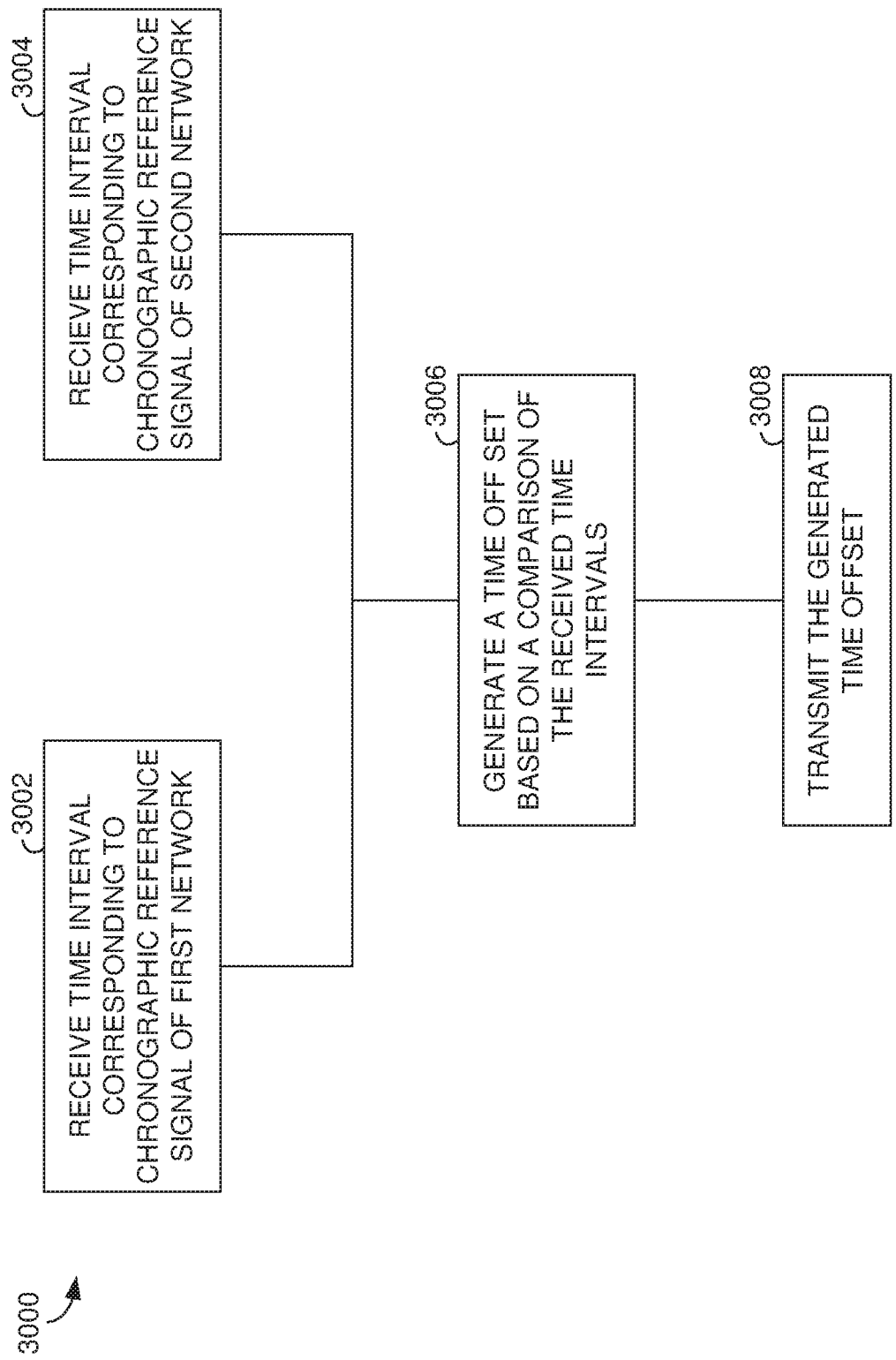
FIG. 3 depicts an exemplary method for generating a time offset, according to an aspect described herein.

With reference to FIG. 3, an example method 3000 for generating a time signal offset is provided in accordance with some aspects described herein. Generally, method 3000 comprises receiving a timing signal for each communications network a time agent (e.g., time agent 1008) is monitoring. Time agent 1008 determines the difference in any two time signals associated with the communication networks that the time agent 1008 is monitoring. Based on the determined difference, time agent 1008 can generate a time signal offset associated with UE transitions between the first communications network and the second communication network. In other words, time agent 1008 can generate the relative difference between two or more chronographic reference signals, each of which is used to coordinate the communicative connection between a UE device and each communications network as the UE device transitions there between.

Some aspects of method 3000 begin with block 3002, when a time agent 1008 can receive, access, detect, or request a time signal generated by timing system that corresponds to a digital chronographic reference signal of a communication network, such as the first communication network 1010. For example, when a communication network timing system (e.g., timing system 1002) broadcasts a time signal to the corresponding communication network (e.g., communication network 1010); a network monitor of a time agent (e.g., network monitor 2002 of time agent 1008) can detect the time signal. Similarly, at block 3004 the time agent can receive, access, detect, or request a time signal generated by timing system (e.g., timing system 1002) that corresponds to a digital chronographic reference signal of a different communication network, such as the second communication network 1012.

Detection, receipt, or request of the time signal can take many forms. For example, in some aspects, detection can be achieved via reception of a data packet that contains a time signal generated by a timing system from the timing system itself, or from base station of an associated communication network. In another example, in some aspects, detection of the time signal is achieved by detecting a digitally signed data set, hash, or a combination of both in a distributed database network (e.g., database network 1006). An example of the generation and distribution of such signed data sets and hashes is described with reference to method 300 as described in reference to FIG. 3 of U.S. patent application Ser. No. 16/044,235.

At block 3006, the time agent can determine the difference in any two time signals associated with the communication networks the time agent is monitoring. For example, time agent may compare $t_x$ and $t_y$ to determine a difference (e.g., Formula 1).

$$t_x - t_y = \Delta t_{xy} \quad (1)$$

Said another way, the difference between any two time signals ($\Delta t_{xy}$) may be expressed as a time the first time signal ($t_x$) is received subtracted by another time the second time signal ($t_y$) is received.

Additionally, or alternatively, Formula 1 may also comprise a correction factor for each time signal based on the physical configuration of the timing systems for the particular communication network. By way of non-limiting example a time signal may be unintentionally delayed by the distance between the timing system (e.g., timing system 1002 or timing system 1004) and the timing agent (e.g., 1008); any transmission delays created by differences in transmission modality (such as fiber optic, Ethernet, Cat5e, Cat6, T1, analog, and similar); subcomponent architecture; or bus speed. A correction factor can account for some or all of the delay. Accordingly, in some aspects, the difference between any two time signals may be as expressed by the Formula 2.

$$(t_x \pm \Sigma \text{correction factors}_x) - (t_y \pm \Sigma \text{correction factors}_y) = \Delta t_{xy} \quad (2)$$

Said another way, the difference between any two time signals ($\Delta t_{xy}$) may be expressed as the time the first time signal ($t_x$) is received plus or minus the sum of any applicable correction factors, subtracted by the time the second time signal ($t_y$) is received plus or minus the sum of any applicable correction factors.

Continuing with block 3006, based on the determined difference between the two time signals, the time agent can generate a time offset for a transition from the first communication network to the second communication network. For example, where $\Delta t_{xy}$ is a positive value (e.g., $t_y$ was detected before $t_x$ or the value of $t_x$ is greater than the value of $t_y$) the time offset can be generated to indicate that $|\Delta t_{xy}|$ (i.e., the absolute value of $\Delta t_{xy}$) is subtracted from a UE's application clock when a particular UE transitions from communicating with the first communication network to communicating with the second communications network. Alternatively, where $\Delta t_{xy}$ is a negative value (i.e., $t_x$ was detected before $t_y$ or the value of $t_y$ is greater than the value of $t_x$) the time offset can be generated to indicate that $|\Delta t_{xy}|$ is added to a UE's application clock when a particular UE transitions from communication with the first communication network to communicating with the second communications network.

At block 3008 the generated time offset can be transmitted by the time agent to the first communication network (e.g., communication network 1010). Generally, the time offset can be transmitted by time agent as a digitally signed data packet or as part of a digitally signed set of packets. For example, the time offset generated in block 3006 can be transmitted to a database of a distributed database network (e.g., database network 1006).

Figure 4:
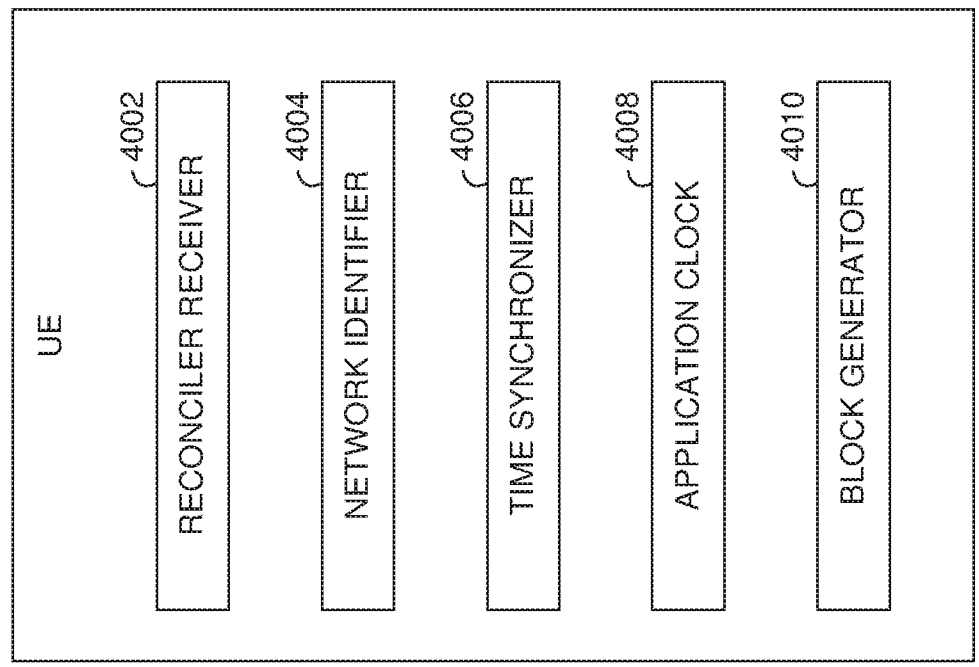
FIG. 4 depicts an exemplary user equipment suitable for implementing aspects described herein.

With reference to FIG. 4, an example UE 4000 is provided in accordance with some aspects described herein. In some aspects, UE 4000 is a user equipment, such as user equipment 1014 of FIG. 1. UE 4000 can include a reconciler receiver 4002, a network identifier 4004, time synchronizer 4006, and application clock 4008. Some aspects of UE 4000 can include a block generator 4010. In some aspects, some or all of reconciler receiver 4002, network identifier 4004, time synchronizer 4006, application clock 4008, and block generator 4010 are executable or controllable in a protected environment of UE 4000. For example, the protected environment of UE 4000 may be a Trusted Execution Environment ("TEE"). In such aspects, UE 4000 may further include TEE private keys which can be used to authenticate a digital signature of data received or otherwise accessed by UE 4000. UE 4000 may include some or all of the components of computer device 8000 (as described in reference to FIG. 8).

In some aspects, reconciler receiver 4002 can monitor remotely maintained distributed ledgers, such as database 1018n, that store entries including a generated time offset. The reconciler receiver 4002 can access the distributed ledgers through wired or wireless communication channels such as a 1× voice circuit, a 3G network (e.g., CDMA, CDMA2000, WCDMA, GSM, UMTS), a 4G network (WiMAX, LTE, HSDPA), a 5G network, a 6G network, fiber optic, Cat5, Cat 6, or the like. Once accessed, or received via a push or request, reconciler receiver 4002 can store a copy of a generated time offset in local memory. Reconciler receiver 4002 can maintain a table of generated time offsets in local memory that includes each time offset generated by a time agent, such as time agent 1008. For example, while connected to the first communication network, reconciler receiver 4002 can acquire generated time offsets from time agent 1008 that can facilitate transitions from the first communication network to the second communication network, transitions from the first communication network to any number of other communication networks, or any combination thereof. The set of generated time offsets can be saved by reconciler receiver 4002 in the table of generated time offsets. Similarly, reconciler receiver 4002 can acquire generated time offsets that facilitate transitions from the second communication network to any number of other communication networks while the UE is connected to the second communication network in aspects where the second communication network also includes a time agent.

Additionally, in some aspects, reconciler receiver 4002 can verify the authenticity of a generated time offset. For example, reconciler receiver 4002 can use a public certificate of authenticity key stored in memory of UE 4000 to cryptographically verify a private certificate of authenticity key corresponding to a trusted entity operating a time agent, such as time agent 1008, used to sign the generated time offset. Similarly, reconciler receiver 4002 can use other cryptographic verification techniques to verify the authenticity of a generated time offset.

In some aspects, network identifier 4004 can monitor and analyze parameters associated with the networks the UE 4000 is currently communicating with and the parameters of networks that UE 4000 could communicate with (e.g., available networks). The parameters associated with a network can be one or more of signal strength, signal to noise ratio, latency, consumed bandwidth, available bandwidth, channel load, channel aggregation capabilities, or any other property of the network. Network identifier 4004 can analyze the parameters by comparing the monitored data with one or more performance thresholds. Based on the results of the analysis the network identifier 4004 can determine which communication network of the available networks UE 4000 is going to begin using. In some aspects, network identifier 4004 can activate time synchronizer 4006 in response to the determination that UE 4000 is going to transition between the first communication network and an available communication network, such as the second communication network.

Time synchronizer 4006 can generate modifications to application clock 4008. The modifications can be based on generated time offsets received or otherwise acquired by reconciler receiver 4002. Additionally, the modifications can be based on the analysis of the network identifier 4004. Time synchronizer 4006 can access the generated time offset stored in local memory corresponding to the transition between the communications networks identified by network identifier 4004. Time synchronizer 4006 can delay the programmatic signal that otherwise incrementally increases the application clock by the adjustment determined in block 5006.

Application clock 4008 can be a chronographic reference for UE 4000. Generally, application clock 4008 can be used by a radio (not depicted) or any other hardware or software component of UE 4000 that facilitates communication between UE 4000 and a communication network, such as first communication network 1010 or second communication network 1012. For example, while UE 4000 and the first communication network 1010 are establishing initial communicative connectivity with each other, the first communication network 1010 may communicate a data packet to UE 4000 that includes the current network time, the time slot in which UE 4000 can communicate with the first communication network, or any other data that provides UE 4000 a chronographic reference consistent with IEEE-1588 (as of 2020). Based on this data, UE 4000 may set application clock 4008. Application clock 4008 may then be used by a radio (not depicted) or any other hardware or software component of UE 4000 to synchronize, or otherwise facilitate, communication between UE 4000 and the first network. As will be understood by those skilled in the art, application clock 4008 can take a number of different forms. In some aspects, application clock 4008 is executed in a protected operating environment of UE 4000.

Block generator 4010 can group individual pieces of data into a block of data (e.g., a data set). Each block of data can be cryptographically linked to a previously-generated block of data. For example, block generator 4010 can include one or more hashing algorithms, such as a Secure Hash Algorithm (SHA) algorithm, or similar cryptographic algorithms. Block generator 4010 can also include a private or public key of a key pair to facilitate digital signing of a generated block of data. As the aforementioned processes for block generation are generally known in the art, additional detail for such processes are not described herein. It is contemplated, however, that any implementation of block generation and consensus determination can be employed in accordance with the present disclosure.

Figure 5:
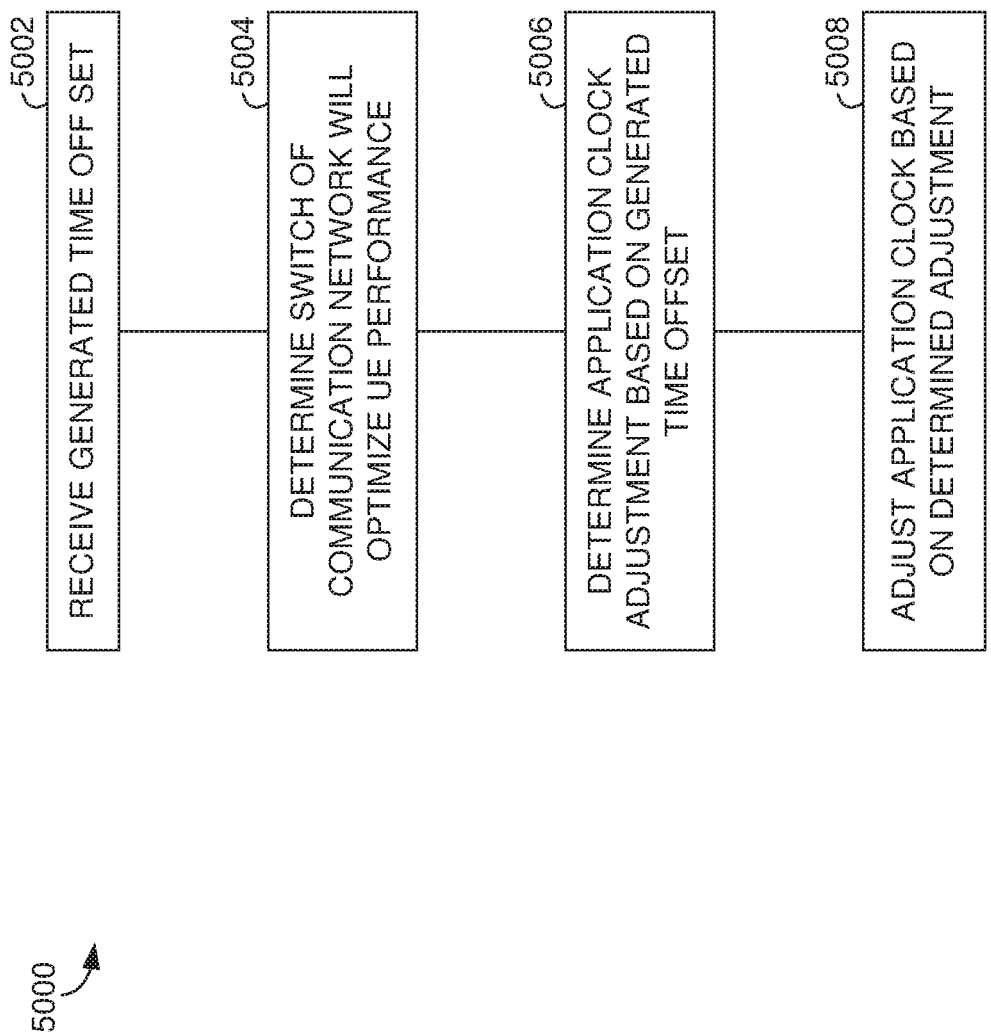
FIG. 5 depicts an exemplary method for adjusting an application clock based on a generated time offset, according to an aspect described herein.

Turning to FIG. 5, and with brief references to FIGS. 1 and 4, an example method 5000 is provided for a remote device, such as UE 1014, to adjust an application clock based on a time signal offset. The adjustment to the application clock may facilitate the remote device to, at least partially, transition from communicating with a first communication network (e.g., communication network 1010) to a second communication network (e.g., communication network 1012). Generally, method 5000 can include receiving a generated time offset and determining, by a remote device, to switch between a first communication network and a second communication network. Method 5000 also includes determining an application clock adjustment based on the received generated time offset. Once an adjustment to the application clock is determined, the application clock can be adjusted. The application clock can be set initially by the remote device during or after the handshake between the remote device and the first communication network. For example, the initial setting and updating of an application clock can be facilitated by an averaged time interval such as described in relation to methods 500 and 600 of U.S. patent application Ser. No. 16/044,235, which is incorporated herein by reference.

Some aspects of method 5000 can begin with block 5002. At block 5002, a generated time offset can be received by a remote device (e.g., UE 1014, 4000). The remote device can access, request, or receive the generated time offset from a time agent (e.g., time agent 1008) associated with a communication network (e.g., communication network 1010). For example, during or after the initial negotiation to establish a communication link (e.g., a handshake) between the remote device and an access point (e.g., base station 1016) of the communication network, the remote device can transmit a request for time offset data. The access point can forward the request to a time agent. The time agent can then respond to the request with the generated time offsets maintained by the time agent. In some aspects, the access point can respond to the remote device's request with the generated time offsets maintained in a local copy of a distributed database (e.g., database 1018*n*). Similarly, during or after the handshake, an access point can push generated time offset data to a remote device.

At block 5004, a determination can be made by a remote device to transition communications that are facilitated by a first communication network to a second communication network. A remote device can monitor parameters associated with the network communications. For example, the parameters associated with a network can be one or more of signal strength, signal to noise ratio, latency, consumed bandwidth, available bandwidth, channel load, channel aggregation capabilities, dropped packet detection, or any other property indicative of the quality of the communication between the remote device and the first communication network or the second communication network. The determination for a remote device to transition between networks can be based on a threshold associated with one or more of the parameters. However, as will be understood by those skilled in the art, the determination to transition between a first communication network and a second communication network can be for any relevant reason and may vary by situation, implementation, or remote device. For example, an autonomous or partially autonomous vehicle can use a first set of criteria to determine a transition from a first communication network to a second communication network; and, a smartphone can use a second set of criteria. In response to the determination to transition communications that are facilitated by a first communication network to a second communication network, some aspects of block 5004 proceed to block 5006.

At block 5006, an application clock adjustment for the remote device can be determined based on the received time offset. Generally, the adjustment to the application clock can be determined based on a time offset corresponding to the communication network transition identified in block 5004. For example, a time synchronizer (e.g., time synchronizer 4006) can access a time offset stored in local memory. The time offset can correspond to transitioning the remote device from a first communication network (e.g., communication network 1010) to a second communication network (e.g., communication network 1012). The time synchronizer can add or subtract the time indicated by the time offset from an application clock. For example, the time synchronizer may detect that a time offset generated by a time agent and communicated to the remote device through the first communication network indicates that to transition from the first communication network to the second communication network requires the addition of 1 fs to the application clock. The time synchronizer can then prepare a 1 fs addition to the application clock.

At block 5008, the application clock of the remote device can be adjusted based on the determined adjustment. The time synchronizer can adjust the application clock in any way. For example, a time synchronizer can delay the programmatic signal that otherwise incrementally increases the application clock by the adjustment determined in block 5006. For another example, a time synchronizer can modify the programmatic signal updating the application clock to increase the application clock with the incremental increase and the adjustment determined in block 5006. Illustratively, a time synchronizer may detect that the application clock is currently set at 100,000 fs and adjustment indicates that 1 fs needs to be added to the application clock. The time synchronizer can then communicate a signal equivalent to a 1 fs increase to the application clock value. The adjusted application clock can then continue to operate as the chronographic reference. For another example, a time synchronizer can copy the current value of the application clock and add or subtract the adjustment determined in block 5006. The time synchronizer may overwrite the value of the application clock with the modified application clock value.

In some aspects, method 5000 can include generating a data set indicative of the transition of the remote device from the first communication network to the second communication network. The data used to generate the set can include a signature corresponding to the remote device, an identifier corresponding to the first communication network, an identifier corresponding to the second communication network, the time offset, the initial application clock value, the modified application clock value, a hash of a previous data set, or any combination thereof. For example, a block generator (e.g., block generator 4010) can collect data used by the remote device to transition from the first communication network to the second communication network. The collected data can be used as input in a hashing algorithm to generate a hash value. In some aspects, the hash value is generated by software, firmware, hardware, and/or a combination thereof, comprising one or more hashing algorithms, such as a Secure Hash Algorithm (SHA) algorithm, or similar cryptographic algorithms. The generated data set, the hash value, or both can be saved locally or communicated to a distributed database. As will be understood by those skilled in the art, the generated data set and the hash value can be used to track the transition of a remote device through a plurality of communication networks.

In some aspects, method 5000 can also include transitioning the remote device from the first communication network to the second communication network. The remote device may communicate a signal to the second communication network requesting an initial communication handshake. In some aspects, the signal can include a data package that indicates the remote device's application clock value.

Figure 6:
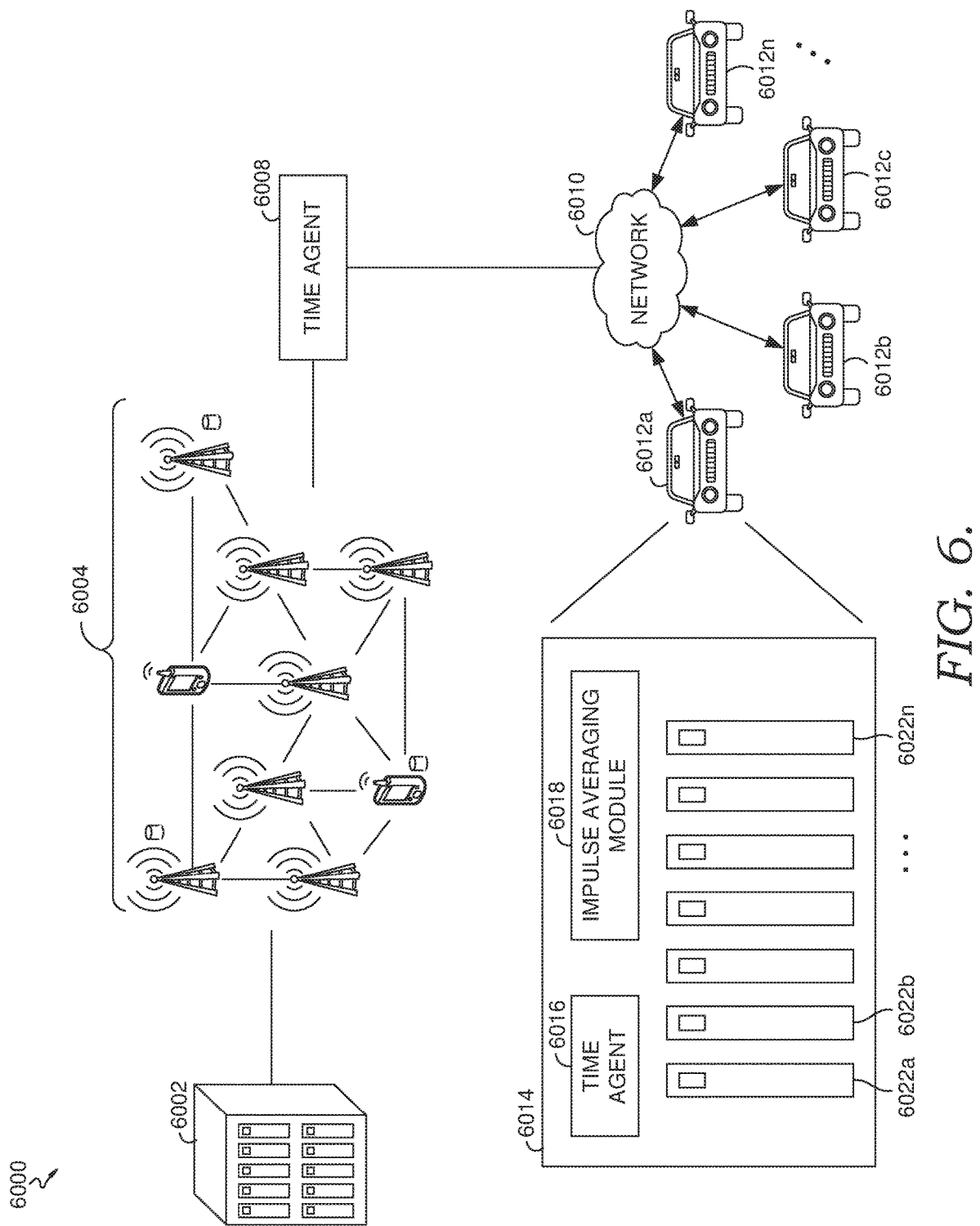
FIG. 6 depicts another exemplary environment suitable for use in implementing aspects described herein.

With reference to FIG. 6, another example network environment 6000 is provided, in accordance with some aspects described herein. Some embodiments of network environment 6000 can facilitate time synchronization across a dynamic network. In other words, network environment 6000 can synchronize precision time in a network that includes multiple network timing systems (i.e., network nodes) that may individually or in groups intermittently connect and disconnect from the network. For example, network environment 6000 can include a plurality of processors distributed across a mesh network of wireless communication enabled vehicles. The vehicles may be autonomous vehicles (e.g., self-driving cars, drones, or other similar vehicles), semi-autonomous vehicles (e.g., any vehicle with computer assisted navigational or guidance systems such as automated parking, adaptive traffic following, lane keeping or any similar feature), or any other vehicle with at least one processor and communication network connectivity. Each of the components shown in FIG. 6 may be implemented via any type of computing device, such as computing device 8000 described in connection to FIG. 8, for example.

Accordingly, network environment 6000 can include a network timing system 6002, a communication network 6004, a network time agent 6008, a dynamic network 6010, and one or more network nodes 6012a-n. Generally, the network timing system 6002 generates and transmits a precision timing signal to the corresponding communication network 6004. In some aspects, the network timing system 6002 comprises network timing system 1002 or 1004 (as discussed in reference to FIG. 1). Similarly, the communication network 6004 can comprise the communication network 1010 or 1012 (as discussed in reference to FIG. 1) and can include one or more database networks, such as database network 1006 (as discussed in reference to FIG. 1). Network time agent 6008 can comprise time agent 2000 (as discussed in reference to FIG. 2).

Continuing, dynamic network 6010 can be a communication network that is directly or indirectly communicatively coupled to network time agent 6008 and comprised of one or more network nodes 6012a-n. The dynamic network 6010 can facilitate direct communicative connections between any two network nodes 6012a-n within a predetermined range. Each network node can directly connect with any number of other network nodes. For example, dynamic network 6010 can be a mesh network that dynamically self-organizes and self-configures to facilitate dynamic distribution of workload, data transfer, or both. Dynamic network 6010 can be facilitated by WiFi, 4G, 5G, 6G, near-field communication (NFC), Bluetooth, ZigBee, any other wireless communication protocol, or any combination thereof.

Network nodes 6012a-n can include any mobile or fixed device that can communicatively couple to dynamic network 6010. For example, network nodes 6012a-n can include autonomous vehicles (e.g., self-driving cars, drones, or other similar vehicles), semi-autonomous vehicles (e.g., any vehicle with computer assisted navigational or guidance systems such as automated parking, adaptive traffic following, lane keeping or any similar feature), or any other vehicle with at least one processor and communication network connectivity. However, it is also contemplated that network nodes 6012a-n include smart sensors or any other communication devices, such as UE 4000 (as discussed in reference to FIG. 4).

Network node 6012a can include a precision time module 6014. Generally, precision time module 6014 synchronizes precision time generation locally and throughout the dynamic network 6010. For example, a locally created averaged time interval can be modified with time offsets to generate a local chronographic reference signal that is synchronized with a remote chronographic reference signal. Accordingly, precision time module 6014 can include a local time agent 6016, at least one processor 6022a, and an impulse averaging module 6018. Local time agent 6016 can also include a time agent such as time agent 2000 (as described in reference to FIG. 2). In some aspects, network nodes 6012b-n include a precision time module 6014.

In some aspects, processor 6022a is specially configured to execute a program that generates output based on a change of state of at least processing core of the processor 6022a. For example, processor 6022a may be a specially configured reduced instruction set computing (RISC) processor, ARM processor, Application-Specific Integrated Circuit (ASIC), complex instruction set computing (CISC) processor, or custom silicon processor (CSP), such as may be or may become available from ARM, Sun, IBM, Intel, or the like. Processor 6022a may be specially configured in a number of ways. For example, processor 6022a may be customized such that at least one core of the processor 6022a changes state every fs, ps, ns, µs, ms, cs, ds, or about every fs, ps, ns, µs, ms, cs, ds.

Additionally, or alternatively, processor 6022a may be specially configured such that in combination with embedded instructions or non-embedded instructions at least one change of state and a corresponding output is completed by the processor 6022a every fs, ps, ns, µs, ms, cs, ds, or about every fs, ps, ns, µs, ms, cs, ds. For example, processor 6022a may be a control unit for a sub-system of a vehicle, such as an electronic control unit (ECU). An ECU can include, but is not limited to engine control module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), or processors associated with a navigational system, entertainment system (e.g., radio, compact disc player, digital video disc player, and so forth.

The change in state of processor 6022a can be determined by output in a variety of forms; such as a change in voltage, a binary data stream (i.e. a string of 1's and 0's), a predetermined value (set of values) in a predetermined register (set of registers), or the like. For example, processor 6022a may be monitored by a zero crossing detector, a threshold detector, and/or a threshold limiter integrated with network node 6012a. In such an embodiment, as the voltage of the processor 6022a crosses or substantially approaches zero V, and/or crosses or substantially approaches a predetermined threshold V, and output is generated by the zero crossing detector, threshold detector, and/or threshold limiter. In another example, processor 6022a may be physically and/or programmatically configured to write, or modify in a predetermined way (by for example changing a 1 to a 0 or 0 to a 1, or adding a 1 or 0), a value in a register accessible by processor 6022a. Generally speaking however, the output indicates a change of state of processor 6022a. Some aspects of precision time module 6014 includes multiple processors similar to processor 6022a, such as processors 6022b-n.

Impulse averaging module 6018 can include a program, application, circuit, or a combination of hardware and software that generates an averaged time interval based on the output of at least one processor (e.g., processor 6022a-n). The averaged time interval can be programmatically determined by the impulse averaging module 6018 based on the averaged frequency of a set of corresponding outputs from processors 6022a-n.

Turning to FIG. 7 and with continued reference for FIG. 6, a method 7000 for synchronizing precision time across a dynamic network in accordance with some aspects described herein is provided. Generally, method 7000 comprises a network node accessing generated time offsets stored by a communication network time agent. The network node can search for other network nodes within a predetermined range. Based on the outcome of the search, the network node can synchronize the node's local chronographic reference by modifying the output of the local impulse averaging module. Aspects of method 7000 can be facilitated by network environment 6000. Some aspects of method 7000 begin with block 7002.

At block 7002, a network node (e.g., network node 6012a) can access time offsets maintained by a network time agent (e.g., network time agent 6008). The network node may access the time offsets maintained by the network time agent in any way, including but not limited to, transmitting a request for the time offsets to the time agent or receiving a push of the time offsets from time agent. For example, during initial power up procedures the network node may connect with a communication network (e.g., communication network 6004) to access the network time agent. Once connected, the network node may transmit the chronographic reference signal generated by an impulse averaging module (e.g., impulse averaging module 6018) and request time offsets from the network time agent. The time offsets may include time offsets corresponding to other network nodes (e.g., network nodes 6012b-n), time offsets for other communication networks, time offsets for dynamic networks (e.g., dynamic network 6010), or any combination thereof. A local time agent (e.g., local time agent 6016) may store a local copy of the time offsets.

Additionally, in some aspects of block 7002, the network node searches for any other network nodes within a predetermined range. The network node can search using active or passive techniques known in the art. The predetermined range may vary based on the type of network node, wireless protocol used, or any other factor. In some aspects, if no other network nodes are detected by the network node within a predetermined period block 7004 may proceed to block 7004. In some aspects, upon detection of a particular network node, (e.g., network node 6012b) block 7002 may proceed to block 7006.

At block 7004, a network node can synchronize the local chronographic reference signal with that of the communication network associated with the network time agent. For example, a precision time module (e.g., precision time module 6014) can modify the average time signal generated by the impulse averaging module based on a time offset corresponding to the communication network stored. Said another way, the locally generated averaged time interval of the network node can be synchronized with the chronographic reference signal of a communication network by the precision time module of the network node. For example, the precision time module can identify the time offset for the communication network. The precision time module can apply the time offset to the output of the impulse averaging module to create a local chronographic reference signal that matches the chronographic reference signal generated by a network timing system (e.g. network timing system 6002) of the communication network. As will be understood by those skilled in the art, the specific modifications used by a precision time module can vary. For example, potential differences in relative precision (e.g., μs precision of the network node and fs precision of a communication network, or vice versa) can influence the modification of a chronographic reference signal.

In some aspects, the network time agent can update the time offset corresponding to the chronographic reference signal difference between the communication network and the network node to zero based on the modification of the averaged time interval by the precision time module. In other words, the network time agent may detect that the precision time module has adjusted the network node's chronographic reference signal. In response, the network time agent can update the time offset corresponding to the network node.

At some point in the future, block 7004 may proceed to block 7006. For example, when the network node (e.g. network node 6012*a*) detects at least one other network node (e.g., network node 6012*b-n*) within a predetermine range, method 7000 may proceed to block 7006.

At block 7006, the chronographic reference signal can propagate through a dynamic network. Generally, method 7000 may proceed to block 7006 when a first network node (e.g., network node 6012*a*) detects a second network node (e.g., network node 6012*b*) within a predetermined range. The first network node may determine how many network nodes (e.g., network nodes 6012*c-n*) are connected to the second network node. For example, the first network node can request the number of other nodes connected to the second network node. For another example, the number of nodes connected to the second network node can be included in a beacon signal broadcast by the second network node.

Based on the number of nodes connected to the second network node, the first network node can determine which chronographic reference signal should be propagated. For example, where the second network node is already connected to at least one network node greater than the first network node, the first network node can readjust the averaged time signal generated by impulse averaging module to generate a locally maintained chronographic reference signal that is synchronized with the second network node. In other words, if the first network node is joining an already existing dynamic network, the first network node may synchronize the local chronographic reference signal with the already existing dynamic network. Similarly, if the first network node's dynamic network is smaller in size than the already existing dynamic network (e.g., first network node's network is n−1, where n=network nodes in already existing network) the first network node may synchronize the local chronographic reference signal. Further, the first network node may communicate the offset for the already existing dynamic network to network nodes of the smaller network.

Alternatively, where the second network node is either not connected with another network node, or second network node is connected to at least one fewer network nodes than the first network node; network node may create, or merge with, a dynamic network. The first network node can send instructions to the second network node to adjust the second network node's chronographic reference signal. The instructions can be passed from the second network node to any other network nodes connected to the second network node.

Thus, the chronographic reference signal of a dynamic network can be synchronized through the network nodes of the dynamic network. Additionally, as the edges of local dynamic networks touch, the chronographic reference signals of the local dynamic networks can be synchronized. Further still aspects of method 7000, can facilitate distributed generation of an averaged time interval.

Having described various embodiments of the disclosure, an exemplary computing environment suitable for implementing embodiments of the disclosure is now described. With reference to FIG. 8, an exemplary computing device is provided and referred to generally as computing device 8000. The computing device 8000 is but one example of a suitable computing environment and is not intended to suggest any limitation as to the scope of use or functionality of the disclosure. Neither should the computing device 8000 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 8, computing device 8000 includes a bus 8010 that directly or indirectly couples the following devices: memory 8012, one or more processors 8014, one or more presentation components 8016, one or more input/output (I/O) ports 8018, one or more I/O components 8020, and an illustrative power supply 8022. Bus 8010 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 8 and with reference to "computing device."

Computing device 8000 typically includes a variety of computer-readable media. Computer-readable media can be any available media that can be accessed by computing device 8000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 8000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 8012 includes computer storage media in the form of volatile and/or nonvolatile memory. The memory may be removable, non-removable, or a combination thereof. Exemplary hardware devices include solid-state memory, hard drives, optical-disc drives, etc. Computing device 8000 includes one or more processors 8014 that read data from various entities such as memory 8012 or I/O components 8020. Presentation component(s) 8016 presents data indications to a user or other device. Exemplary presentation components include a display device, speaker, printing component, vibrating component, and the like.

The I/O ports 8018 allow computing device 8000 to be logically coupled to other devices, including I/O components 8020, some of which may be built in. Illustrative components include a microphone, joystick, game pad, satellite dish, scanner, printer, wireless device, etc. The I/O components 8020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 8000. The computing device 8000 may be equipped with depth cameras, such as stereoscopic camera systems, infrared camera systems, RGB camera systems, and combinations of these, for gesture detection and recognition. Additionally, the computing device 8000 may be equipped with accelerometers or gyroscopes that enable detection of motion. The output of the accelerometers or gyroscopes may be provided to the display of the computing device 8000 to render immersive augmented reality or virtual reality.

Some embodiments of computing device 8000 may include one or more radio(s) 8024 (or similar wireless communication components). The radio 8024 transmits and receives radio or wireless communications. The computing device 8000 may be a wireless terminal adapted to receive communications and media over various wireless networks. Computing device 8000 may communicate via wireless protocols, such as long term evolution ("LTE"), code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, LTE, GPRS, GSM, TDMA, and 802.16 protocols.

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

The invention claimed is:

1. A computer-implemented method for generating a digital chronographic reference signal, the method comprising:
   generating a first chronographic reference signal of a first network that is defined by averaging a duration of each operational cycle of a first plurality of processors;
   receiving, by a time agent, the first chronographic reference signal of the first network;
   receiving, by the time agent, a second chronographic reference signal of a second network;
   generating, by the time agent, a first time offset interval based on a comparison of the first chronographic reference signal and the second chronographic reference signal and defining a difference between chronographic reference signals of the first network and the second network;

establishing a communication link with a remote computing device using a base station of the first network; and transmitting, by the base station of the first network, at least a first signal to the remote computing device, the first signal including the first time offset interval and a cryptographically derived signature.

2. The computer-implemented method of claim 1, wherein authenticity of the first time offset interval is verified within a trusted execution environment of the remote computing device based on the cryptographically derived signature.

3. The computer-implemented method of claim 1, wherein the time agent receives the first time interval from a database maintaining a local instance of a distributed ledger.

4. The computer-implemented method of claim 3, wherein authenticity of the first time interval is determined by the time agent based on a hashed set of data corresponding to the first time interval.

5. The computer-implemented method of claim 1, wherein the chronographic reference signal of the second network is defined by averaging a duration of each operational cycle of a second plurality of processors.

6. The computer-implemented method of claim 1, wherein the first network and the second network comprises a 5G communication network.

7. The computer-implemented method of claim 1, wherein in response to receiving the transmission of at least the first signal the remote computing device, the remote computing device adjusts an application clock by the first time offset.

8. The computer-implemented method of claim 7, wherein the method further comprises transitioning the remote computing device from the first network to the second network.

9. A system comprising:
at least one processor;
at least one set of computer codes that when executed by the at least one processor cause the at least one processor to perform operations comprising:
generating a first chronographic reference signal of a first network that is defined by averaging a duration of each operational cycle of a first plurality of processors;
receiving the first chronographic reference signal of the first network;
receiving a second chronographic reference signal of a second network;
generating, by the at least one processor, a first time offset interval based on a comparison of the first chronographic reference signal and the second chronographic reference signal and defining a difference between chronographic reference signals of the first network and the second network; and
establishing a communication link with a remote computing device using a base station of the first network;
transmitting, by the base station and via the communication link the first network, at least a first signal to the remote computing devices, the first signal including the first time offset interval and a cryptographically derived signature.

10. The system of claim 9, wherein the operations further comprise signing the first time offset interval with the cryptographically derived signature.

11. The system of claim 9, wherein the operations further comprise:
receiving a third time interval corresponding to a chronographic reference signal of a third network;
generating a second time offset interval based on a comparison of the first time interval and the third time interval; and
transmitting, over the network, at least the second time offset interval to one or more remote computing devices.

12. The system of claim 9, wherein in response to receiving the transmission a first remote computing device of the one or more remote computing devices adjusts an application clock based on the first offset.

13. The system of claim 9, wherein the second network comprises at least one of a 5G network, a WiFi network, or a mesh network.

14. One or more non-transitory computer-readable media storing executable instructions that when executed by a set of processors cause the set of processors to perform a method, the method comprising:
generating a first chronographic reference signal of a first network that is defined by averaging a duration of each operational cycle of a first plurality of processors;
receiving, by a time agent, the first chronographic reference signal of the first network;
receiving, by the time agent, a second chronographic reference signal of a second network;
generating, by the time agent, a first time offset interval based on a comparison of the first chronographic reference signal and the second chronographic reference signal and defining a difference between chronographic reference signals of the first network and the second network;
establishing a communication link with a remote computing device using a base station of the first network; and
transmitting, by the base station of the first network, at least a first signal to the remote computing device, the first signal including the first time offset interval and a cryptographically derived signature.

15. The non-transitory computer-readable media of claim 14, wherein authenticity of the first time offset interval is verified within a trusted execution environment of the remote computing device based on the cryptographically derived signature.

16. The non-transitory computer-readable media of claim 14, wherein the time agent receives the first time interval from a database maintaining a local instance of a distributed ledger.

17. The non-transitory computer-readable media of claim 16, wherein authenticity of the first time interval is determined by the time agent based on a hashed set of data corresponding to the first time interval.

18. The non-transitory computer-readable media of claim 14, wherein the chronographic reference signal of the second network is defined by averaging a duration of each operational cycle of a second plurality of processors.

19. The non-transitory computer-readable media of claim 14, wherein in response to receiving the transmission of at least the first signal the remote computing device, the remote computing device adjusts an application clock by the first time offset.

20. The non-transitory computer-readable media of claim 19, wherein the method further comprises transitioning the remote computing device from the first network to the second network.

* * * * *